Oct. 15, 1940.     F. H. EHNTS     2,217,740
LUBRICATING FITTING
Filed Aug. 17, 1938

INVENTOR
Fred Henry Ehnts.
BY
Fraser, Myers & Manley
ATTORNEYS.

Patented Oct. 15, 1940

2,217,740

UNITED STATES PATENT OFFICE 2,217,740

LUBRICATING FITTING

Fred Henry Ehnts, Lansdowne, Pa., assignor to Keystone Lubricating Company, Philadelphia, Pa., a corporation of Pennsylvania Application August 17, 1938, Serial No. 225,285

6 Claims. (Cl. 184—105)

My present invention relates to fittings for low pressure lubrication for ball and roller bearings and aims to provide certain improvements therein. More particularly, it relates to such fittings and to the combination of such fitting with a bearing housing for providing a tell-tale or indication when the bearing housing being lubricated has been supplied with the requisite amount of grease.

The practice heretofore conventionally followed in the lubrication of ball and roller bearings with grease has been to inject the grease under pressure into the bearing housing either by means of a high pressure grease gun through a high pressure fitting, or by a hand compression cup. With either device the risk of under lubrication is obvious. Even more serious, however, is the danger of overpacking the housing with lubricant, resulting in power losses, overheating due to internal friction and excessive wear, the placing of undue stresses on the bearing races, and the wasting of lubricant. Recognizing these inherent dangers, the bearing manufacturers recommend that ball and roller bearing housings be charged no more than two-thirds full of grease, and preferably only one-third to one-half full.

Until quite recently no means were available for indicating when a bearing housing had been properly charged with viscous lubricant and one had to trust to chance that enough and not too much grease had been supplied thereto.

In my co-pending application, Serial No. 203,011, filed April 20, 1938, and particularly Figs. 1 to 3 thereof, I have shown a fitting which is calibrated to provide for the proper lubrication of ball and roller bearings where the fitting is connected directly to the opening in the bearing housing and the housing clearance around the anti-friction member races is not large. While said fitting is suitable and far superior to any device heretofore proposed for lubricating bearing housings of relatively large size, and those where considerable clearance is provided within the housing around the anti-friction member races, I have found that, even with such bearing housings a tell-tale fitting can be provided to indicate when the bearing housing is charged one-third, one-half or even two-thirds full of grease.

Accordingly, my present invention has for its primary object the provision of a fitting in combination with a bearing housing whereby to provide a tell-tale for insuring proper lubrication to the bearing therein, be it desired to charge the housing with grease to any proportion of its capacity. The invention will be better understood from a detailed description which follows when considered in connection with the accompanying drawing, wherein.

Figure 2:
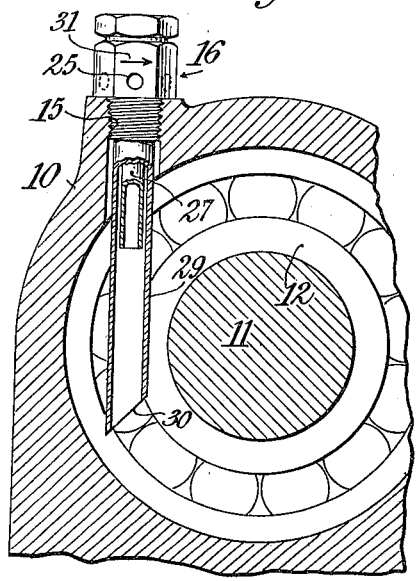
Fig. 2 is a section taken substantially along the plane of the line 2—2 of Fig. 1.

Referring to the drawing, the reference numeral 10 indicates a bearing housing through which a shaft 11 extends and mounted between said shaft and the bearing housing is an anti-friction member herein shown as consisting of a pair of races 12 and 13 having a plurality of anti-friction balls 14 disposed therebetween. The specific characters of the housing and of the anti-friction members do not per se form a part of my present invention. Formed in the housing, preferably at the top thereof and disposed to one side of the shaft 11, is a screw-threaded opening 15 in which is connected a lubricating fitting indicated generally by the reference character 16.

The fitting 16 comprises a casing 17 of general tubular form, having a bore therethrough of different diameters. The casing at its top has an enlarged bore 18 which is internally screw-threaded and terminates in a shoulder 19 leading to a bore 20 of lesser diameter terminating in a shoulder 21 and from there proceeding in further reduced uniform diameter 22 to an inverted shoulder 23 from which it extends to the bottom of the casing in somewhat enlarged diameter to provide a bore 24. The casing 17 is formed with one or more lateral openings 25 therethrough leading from the bore 22 to the exterior of the casing for a purpose which will be presently described. At its lower end the casing is somewhat reduced in diameter and externally screw-threaded, as indicated at 26, for engagement with the screw-threaded opening 15 in the bearing housing.

Disposed within the casing and extending from a point above the shoulder 21 through the bottom of the casing is a tubular element 27 which may be held within the casing by being secured to a washer 28 which in turn may be force-fitted into the bore 20 to seat against the shoulder 21, or held within the casing in any other desired manner. This tubular element 27 serves as the duct through which viscous lubricant which is received from the top of the casing from a suitable source (not shown) is supplied to the interior of the bearing housing 10.

To insure an accurate control the back pressure at which the viscous lubricant charged into the bearing housing will back-up and exude through the openings 25 leading from the chamber formed between the wall of the bore 22 and the outer wall of the tubular element 27, I provide a second tubular element 29 disposed in substantially concentric spaced relation to the tubular element 27 and extending a substantial distance beyond the inner end thereof. The complemental walls of the tubular elements 27 and 29 are preferably smooth and the cross-sectional area therebetween and the length of said elements are calibrated so as to provide the necessary resistance to the back-flow of the lubricant to permit said lubricant to exude out of the openings 25 when the lubricant being charged into the bearing housing has built up the desired back pressure.

The tubular element 29 may be either integrally or separately formed from the casing 16 and, as herein shown, is formed as a separate element which is force-fitted or otherwise fixedly held within the bore 24 of the casing 16 so that the internal wall of the tubular extension element 29 and the bore 22 through the casing will be flush with one another.

Figure 1:
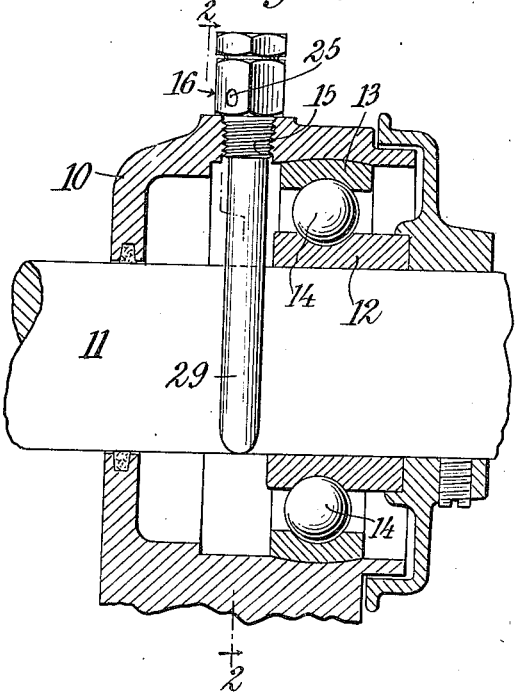
Figure 1 is an axial section through a bearing housing showing my invention applied thereto.
Figure 3:
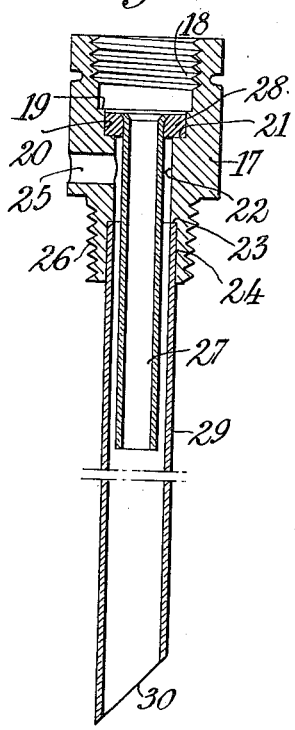
Fig. 3 is an axial section on an enlarged scale of the fitting shown in Figs. 1 and 2.

Preferably the inner end of the tubular element 29 is chamfered or cut at an angle as shown at 30 to the axis of the fitting and the opening in the end of the tube thus provided is set to face the axis of the shaft 11. To insure such arrangement the top of the casing 16 may be formed with a suitable arrow or other index 31. The relative dimensions of the tubular elements 27 and 29 and the degree to which the tubular extension 29 will extend into the bearing housing will govern the amount of lubricant which can be charged into the bearing housing before the back pressure will build up sufficiently to cause the lubricant to exude out of the openings 25. In Figs. 1 and 2 of the drawing the tubular extension 29 is shown as extending down into the bearing housing to a point about one-third up from the bottom of the housing. With this arrangement of the fitting within the housing, and with the parts of the fitting calibrated substantially in the proportions illustrated, I have found that lubricant will exude out of the openings 25 when the bearing housing has been charged with viscous lubricant to about one-third its capacity. With a tubular extension extending down to about the horizontal plane of the axis of the shaft, I have found that the tell-tale will be effective when the housing has been charged to about one-half its capacity. Inasmuch as bearing manufacturers recommend that bearing housings should be charged no more than two-thirds full of grease, and preferably only one-third to one-half full, it will be appreciated that by varying the degree to which the tubular extension 29 extends into the bearing housing, the degree to which the bearing housing may be charged with lubricant can be regulated. It will be further appreciated that the relative lengths of the tubular elements 27 and 29 will also have to be varied as the lengths of the tubular element 29 vary, the progressive increase or decrease in length of the tubular extension 29, however, is not necessarily in direct proportion to the increase or decrease in length of the tubular element 27, and that the fitting will operate satisfactorily even though the free end of the tubular element 29 is not chamfered.

From the foregoing detailed description it will be apparent that I have provided a simple, efficient, and practicable fitting and a combination of such fitting with a bearing housing for controlling the predetermined degree to which such housing may be charged with lubricant, and for providing a visible tell-tale for indicating when such condition has been attained. The invention herein shown and described, although constituting a preferred form, it is to be understood is not to be construed as limiting since the specific construction and arrangement of parts may be varied within the range of engineering skill without departing from the spirit of the invention.

What I claim is:

1. A lubricating fitting comprising a tubular casing having at its top means for engagement with a source of viscous lubricant, means below its top for attachment to a member for receiving the lubricant upon discharge from the fitting, a tubular element disposed within the bore of said casing below the top thereof in spaced relation to the wall of said bore, said casing having an opening in the wall thereof in proximity to the top of the casing providing open communication between the exterior of the casing and the space between the wall of the casing bore and the outer wall of the tubular element and said casing having a tubular axial extension encircling the tubular element in substantially concentric relation thereto and free of engagement therewith and of a length extending from a point in the casing below the opening therein to a substantial distance beyond the lower end of the tubular element.

2. A lubricating fitting according to claim 1 wherein the free end of the axial tubular extension extends at an oblique angle to the axis of the extension.

3. In combination, an anti-friction bearing housing and a tell-tale fitting for indicating when a predetermined amount of viscous lubricant has been supplied to said bearing housing, said telltale fitting comprising a tubular casing connected to said bearing housing and having at its outer end means for engagement with a source of viscous lubricant, a tubular element within the bore of said casing in spaced relation to the wall of said bore and extending into the bearing housing a substantial distance, said casing having an opening therein outwardly of the bearing housing providing open communication between the exterior of the casing and the space between the wall of the casing bore and the outer wall of the tubular element and said casing having a tubular axial extension in surrounding spaced relation to the tubular element extending a substantial distance into the bearing housing.

4. The combination according to claim 3 wherein the tubular axial extension extends farther inwardly within the bearing housing than the tubular element.

5. The combination according to claim 3 wherein the tubular axial extension extends farther inwardly within the bearing housing than the tubular element and having its inner end disposed at an angle to the axis of the extension and directed toward the axis of the bearing.

6. The combination according to claim 3 wherein the axis of the bearing is substantially horizontal and the tell-tale fitting extends through the top of the bearing housing inwardly to at least the horizontal plane of the bearing axis.

FRED HENRY EHNTS.